United States Patent [19]

Tokiwa

[11] Patent Number: 4,557,168
[45] Date of Patent: Dec. 10, 1985

[54] METHOD AND APPARATUS FOR DETECTING THE CUTTING RESISTANCE IN BANDSAW MACHINES

[75] Inventor: Toru Tokiwa, Odawara, Japan

[73] Assignee: Amada Company, Limited, Japan

[21] Appl. No.: 479,122

[22] Filed: Mar. 28, 1983

[30] Foreign Application Priority Data

Mar. 30, 1982 [JP] Japan .................................. 57-49992

[51] Int. Cl.⁴ ............................................. B23D 53/00
[52] U.S. Cl. ........................................ 83/56; 83/62.1;
83/72; 83/802; 83/820
[58] Field of Search .................... 83/72, 74, 56, 62.1,
83/62, 789, 802, 820

[56] References Cited

U.S. PATENT DOCUMENTS

| | | | |
|---|---|---|---|
| 2,602,987 | 7/1952 | Wells | 83/62 |
| 2,649,646 | 8/1953 | Remmen | 83/72 |
| 3,269,248 | 8/1966 | Nast et al. | 83/371 |
| 4,258,601 | 3/1981 | Tanabe | 83/820 |
| 4,290,330 | 9/1981 | Washio | 83/820 |
| 4,355,555 | 10/1982 | Kobayashi et al. | 83/62.1 |
| 4,437,367 | 3/1984 | Hauser | 83/74 X |

*Primary Examiner*—James M. Meister
*Attorney, Agent, or Firm*—Wigman & Cohen

[57] ABSTRACT

A method for detecting the cutting resistance of a workpiece to a bandsaw blade comprises the steps of: magnifying movement of the bandsaw blade by a magnifying device in a direction normal to a running direction of the bandsaw blade; detecting the movement of the bandsaw blade by a sensor in the direction normal to the running direction of the bandsaw blade; and adjusting a force exerted by a feed speed of the bandsaw blade during a cutting operation in immediate response to momentary changes in the cutting resistance of the workpiece to the bandsaw blade. An apparatus for carrying out the method is also disclosed.

12 Claims, 4 Drawing Figures

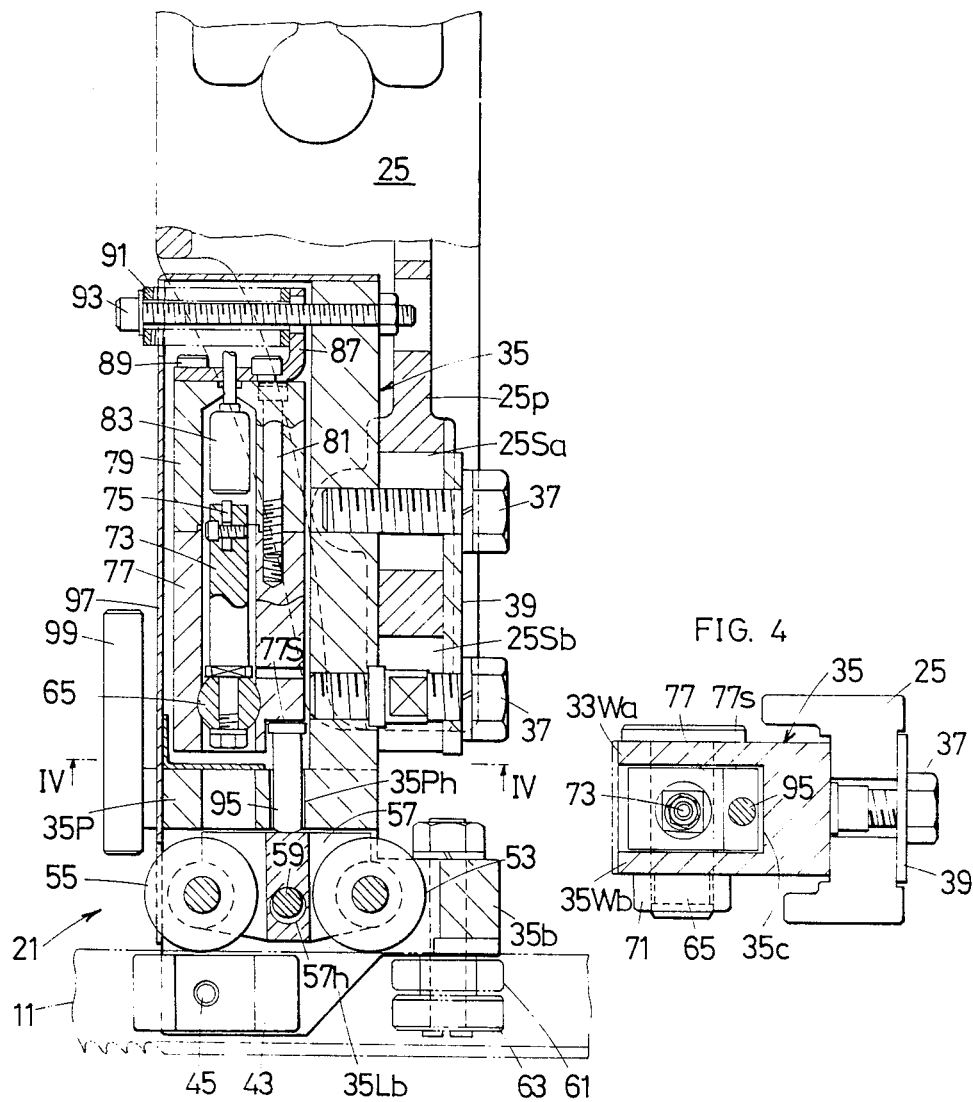

METHOD AND APPARATUS FOR DETECTING THE CUTTING RESISTANCE IN BANDSAW MACHINES

BACKGROUND OF THE INVENTION

1. Field of the Invention

The present invention relates generally to bandsaw machines having a flexible bandsaw blade trained around a plurality of wheels or pulleys to perform cutting operations and, more particularly, pertains to methods and apparatus for detecting the cutting resistance in bandsaw machines.

2. Description of the Prior Art

The prior art concerning the present invention will be described, by way of example, about what is called a horizontal bandsaw machine, although the present invention is applicable not only to horizontal bandsaw machines but also to vertical bandsaw machines.

As is well known, horizontal bandsaw machines comprise a base on which a workpiece or workpieces to be cut are placed and clamped and a cutting head assembly in which a flexible endless bandsaw blade is trained around a pair of wheels or pulleys, one of which is power driven to drive the bandsaw blade. In the cutting head assembly, the bandsaw blade is slidably held and guided with its cutting edge faced perpendicularly downwardly by a pair of guide means at the cutting zone where cutting is performed so that it may cut into the workpiece. The cutting head assembly is so arranged as to be raised away from and lowered toward the base by a suitable means such as a hydraulic motor around a hinge pin or along one or more vertically disposed guide means. Thus, in each cutting cycle, the cutting head assembly is first raised and then lowered towards the base so as to enable the bandsaw blade being driven therein around the wheels to cut the workpiece which has been placed and clamped on the base. Also, in automatic horizontal bandsaw machines, there are provided arrangements for automatically raising and lowering the cutting head assembly and automatically feeding workpieces to be cut into the cutting zone after completion of each cutting cycle.

In such horizontal bandsaw machines, it is desired to feed the bandsaw blade into the workpiece to be cut always at an optimum feeding speed with an optimum feeding force in order to perform an efficient cutting operation with a high cutting accuracy without decreasing the life of the bandsaw blade. For this purpose, it is necessary to control the feeding speed and force of the bandsaw blade during a cutting operation by accurately detecting the cutting resistance with which the bandsaw blade will meet.

It has been customary that the cutting resistance of the bandsaw blade is detected by obtaining the back pressure which will occur during a cutting operation in the hydraulic cylinder for raising and lowering the cutting head assembly holding the bandsaw blade. In this method, the force applied to the bandsaw blade during the cutting operations is detected as a normal component of the cutting resistance based upon the difference between the back pressure of the hydraulic cylinder in cutting operation and that out of cutting operation. In this conventional method, however, it has been impossible to detect momentary changes in the cutting resistance during a cutting operation, and it is only possible to obtain an average cutting resistance, since the normal component of the cutting resistance on the bandsaw blade is indirectly obtained at a position away from the cutting zone of the bandsaw blade. Although various attempts have been made to detect the cutting resistance in bandsaw machines, it has been conventionally impossible to control the feeding speed and force in immediate response to changes in the cutting resistance.

SUMMARY OF THE INVENTION

It is a general object of the present invention to provide a method and apparatus for detecting the cutting resistance on the bandsaw blade in bandsaw machines.

It is an object of the present invention to provide a method and apparatus for immediately detecting changes in the cutting resistance on the bandsaw blade during a cutting operation in bandsaw machines.

It is another object of the present invention to provide a method and apparatus for accurately detecting the cutting resistance on the bandsaw blade by magnifying the movement of the bandsaw blade during a cutting operation in bandsaw machines.

In order to attain these objects according to the present invention, a bandsaw machine is provided with a backup means kept biased to the bandsaw blade to hold the same, a magnifying means for magnifying the movement of the bandsaw blade and a detecting means for detecting the magnified movement of the bandsaw blade in order to detect the cutting resistance.

Other and further objects and advantages of the present invention will be apparent from the following description and accompanying drawings which, by way of illustration, show a preferred embodiment of the present invention and the priniciple thereof.

BRIEF DESCRIPTION OF THE DRAWINGS

FIG. 3 is a partial view shown in section substantially taken along the line III—III of FIG. 2.

FIG. 4 is a cross-sectional view taken along the line IV—IV of FIG. 3.

DESCRIPTION OF THE PREFERRED EMBODIMENTS

Figure 1:
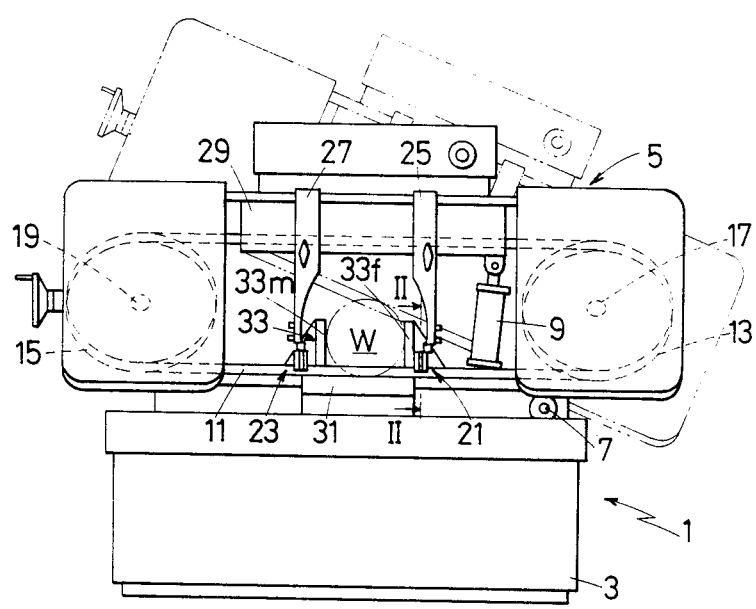
FIG. 1 is a front elevational view of a horizontal bandsaw machine embodying the principles of the present invention.

Referring now to FIG. 1, there is shown a horizontal bandsaw machine which is generally designated by the numeral 1 and comprises a box-like base 3 and a saw head assembly 5 vertically movable toward and away from the base 3 as is conventional. The saw head assembly 5 is pivotally connected to the base 3 by means of a hinge pin 7 and is so arranged as to be raised and lowered away from and toward the base 3 by a hydraulic motor 9 of a cylinder type. In the saw head assembly 5, a flexible endless bandsaw blade 11 is trained around a pair of driving and driven wheels 13 and 15 having shafts 17 and 19, respectively, so that the bandsaw blade 11 may be driven to make a cutting action when the driving wheel 13 is power driven. The bandsaw blade 11 at the cutting zone of the horizontal bandsaw machine 1 is slidably held or guided with its cutting edges faced vertically downwardly by a pair of guide assemblies 21 and 23 which will be described in great detail hereinafter. The guide assemblies 21 and 23 are detachably fixed or integrally provided at lower ends of depending arm members 25 and 27, respectively, which are adjustably held by a beam member 29 fixed at the upper portion of the saw head assembly 5. Also, a worktable 31 is mounted at the cutting zone on the base 3 so that a workpiece W to be cut may be placed thereon, and a vise assembly 33 having a fixed jaw 33f and a movable jaw 33m is also mounted on the base 3 to hold the workpiece W to be cut therebetween. Thus, when the saw head assembly 5 is swung down around the hinge pin 7 from its raised position shown by the imaginary lines in FIG. 1, the bandsaw blade 11 rotating around the driving and driven wheels 13 and 15 in the saw head assembly 5 will be fed to cut the workpiece W held by the vise assembly 33 on the work-table 31.

In this connection, it should be noted that the present invention is applicable to any suitable known type of bandsaw machines, although the invention has been and will be described hereinbefore and hereinafter with regard to the horizontal bandsaw machine 1 in which the saw head assembly 5 carrying the bandsaw blade 11 is swung up and down around the hinge pin 7. For example, the present invention is also applicable to horizontal bandsaw machines in which a cutting head assembly is vertically moved in its entirety along a single or a plurality of vertical guide means such as a post or posts, and it is further applicable to vertical bandsaw machines in which a bandsaw blade vertically travels around upper and lower wheels.

Figure 2:
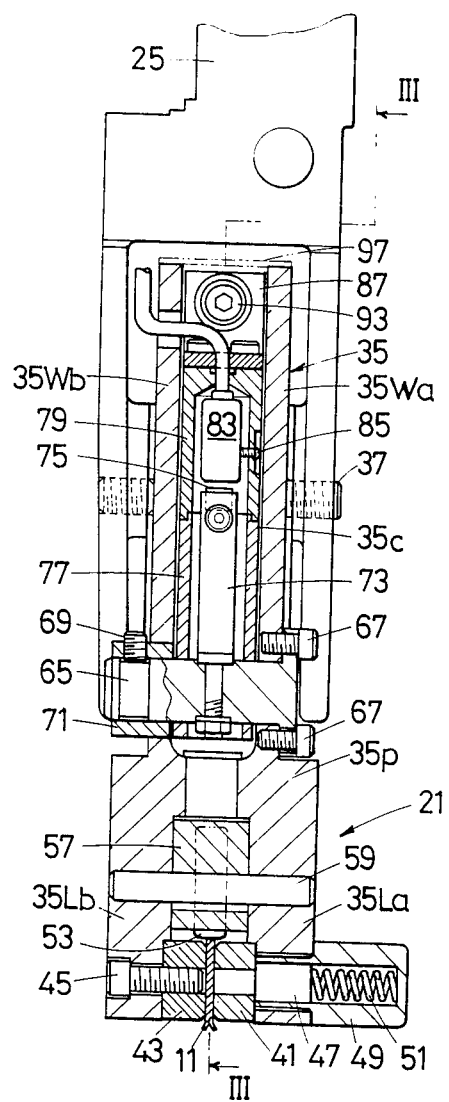
FIG. 2 is a partial view showing a portion of the horizontal bandsaw machine shown in FIG. 1 in section substantially taken along the line II—II of FIG. 1.

Referring to FIGS. 2, 3 and 4, the guide assembly 21 comprises an elongated channel-like frame 35 which is vertically and detachably fixed to the lower end of the arm member 25 by a plurality of bolts 37. The channel-like frame 35 of the guide assembly 21 is provided with a pair of parallel walls 35wa and 35wb forming a channel-like concavity 35c therebetween and is also provided at the proximity of the lower end with a partition 35p connecting the walls 35wa and 35wb and having a hole 35ph shown in FIG. 3 only for a purpose of assembling. The frame 35 of the guide assembly 21 is further provided at its lowermost end with a pair of downward depending parallel plate-like legs 35La and a 35Lb both shown in FIG. 2 between which a projection 35b shown only in FIG. 3, is provided to project in a direction opposite to the opening of the channel-like concavity 35c, shown in FIGS. 2 and 4. The frame 35 of the guide assembly 21 of this configuration shown in FIG. 2 is fixed to the lower end of the arm member 25 by the bolts 37 in a manner such that the channel-like concavity 35c will open or face toward the guide assembly 23 shown in FIG. 1 and held by the arm member 27. In the preferred embodiment as shown in FIG. 5, the arm member 25 is provided at its lower end with a downwardly depending plate-like projection 25p having two slots 25sa and 25sb, and the frame 35 of the guide assembly 21 is vertically adjustably fixed to the projection 25p by means of a spacer plate 39 with the bolts 37 passing through the slots 25sa and 25sb. More particularly, the slots 25sa and 25sb are formed on the projection 25p of the arm member 25 to vertically align with each other, and the bolts 37 are vertically movably disposed in the slots 25sa and 25sb to vertically adjustably hold the frame 35 of the guide assembly 21 on the projection 25p by means of the spacer plate 39.

A pair of blade guide members 41 and 43, both shown in FIG. 2 are made of a wear-resistant material such as a cemented carbide, and are detachably provided between the legs 35La and 35Lb of the frame 35 of the guide assembly 21 so as to slidably guide the bandsaw blade 11 therebetween. The blade guide member 43 is detachably fixed to the inner side of the leg 35Lb of the frame 35 by a bolt 45, while the blade guide member 41 is held by a pin 47 biased toward the blade guide member 43 on the inner side of the leg 35La of the frame 35. As seen from FIG. 2, the pin 47 is fixed to the blade guide member 41, and it is horizontally slidably held in the sleeve-like member 49 mounted on the leg 35La of the frame 35 and is kept biased toward the blade guide member 43 by a spring 51 provided in the sleeve-like member 49. Thus, the bandsaw blade 11 is resiliently guided between the blade guide member 41 and 43 in a manner such that the blade 11 will be kept biased to the blade guide member 43 by the blade guide member 41.

In order to hold the back edge of the bandsaw blade 11, a pair of backup guide rollers 53 and 55 both shown in FIG. 3, are freely rotatably provided between the legs 35La and 35Lb of the frame 35 of the guide assemby 21 on a level higher than the blade guide members 41 and 43. The guide backup rollers 53 and 55 are freely rotatably held by a holding member 57 in a manner such that they are radially aligned with each other on the opposite ends of the holding member 57 to ride on the back edge of the bandsaw blade 11. The holding member 57 is formed with a horizontal hole 57h at its central portion between the backup rollers 53 and 55, and this holding member 57 is swingably held on a pin 59 which is horizontally fixed between the legs 35La and 35Lb of the frame 35 through the hole 57h. Also, the hole 57h of the holding member 57 is formed to be larger in diameter than the pin 59 so that the holding member 57 may be not only swung like a see-saw on the pin 59 but also may be slightly raised up from the pin 59. Thus, the backup guide rollers 53 and 55 will hold the back edge of the bandsaw blade 11 while rotating when the bandsaw blade 11 is being moved between the blade guide members 41 and 43 to make a cutting action. Also, the holding member 57 will be raised up by the backup guide rollers 53 and 55 when a high cutting resistance occurs to cause the bandsaw blade 11 to move upwardly to raise the holding member 57, since the hole 57h of the holding member 57 has been formed larger in diameter than the pin 59.

As shown in FIG. 3, a pair of twisting rollers 61 and 63 is provided on the projection 35b of the frame 35 of the guide assembly 21 to twist the bandsaw blade 11, since the shafts 17 and 19 shown only in FIG. 1, of the driving and driven wheels 13 and 15 are disposed to be tilted at an angle in the preferred embodiment. The twisting rollers 61 and 63 are freely rotatably held by the projection 35b of the frame 35 on different levels of height from each other so as to twist the bandsaw blade 11 on the opposite sides thereof. Thus, the bandsaw blade 11, when rotated on the driving and driven wheels 13 and 15, shown in FIG. 1 only will be previously twisted by the twisting rollers 61 and 63 shown in FIG. 3 only before going into and between the blade guide members 41 and 43 both shown in FIG. 2 only, so that its cutting edge may be kept faced downwardly thereby at the cutting zone.

As shown in FIG. 2, a shaft 65 is horizontally fixed between the walls 35wa and 35wb of the frame 35 of the guide assembly 21 above the partition 35p in parallel with the pin 59 for the holding member 57 holding the backup guide rollers 53 and 55. In the preferred embodiment, the shaft 65 is fixed to the wall 35wa of the frame 35 by a plurality of bolts 67 and to the wall 35wb by a set screw 69 and a collar 71. An elongated holding member 73 is vertically fixed to the shaft 65 to upwardly extend therefrom, and this member 73 is provided at its top with a magnetic element 75. A rocking member 77, which is of a square sleeve in shape, is swingably held on shaft 65 around the holding member 73 so that it may be slightly rocked on the shaft 65 between the walls 35wa and 35wb of the frame 35. The rocking member 77 is formed at its lower end with a shouldered portion 77s shown only in FIG. 4. As shown in FIG. 2, the rocking member 77 is located just above the shaft 65 for the holding member 57 holding the backup guide rollers 53 and 55 for a purpose which will be described hereinafter. Also, as shown in FIG. 3 a cap member 79 is fixed to the top of the rocking member 77 by a plurality of bolts 81, as shown in FIG. 2, a sensing means 83 is fixed to the inner side of the cap member 79 by a plurality of bolts 85 to be located above the magnetic element 75. The sensing means 83 is so arranged as to sense or detect the relative displacement of the magnetic element 75 fixed to the holding member 73 and output a direct voltage according to the displacement of the magnetic element 75. Thus, when the rocking member 77 is rocked on the shaft 65 to move the cap member 79, the sensing means 83 will be moved by the cap member 79 to sense or detect the relative displacement of the magnetic element 75. Also, the magnetic element 75 and the sensing means 83 are protected from dust by the cap member 79.

As best shown in FIG. 3, the cap member 79 is provided at its top with a L-shaped spring shoe 87 fixed thereto by a plurality of bolts 89. Cap member 79 is kept biased by a stiff spring 91 by means of the spring shoe 87 in a direction opposite to the opening in the channel-like concavity 35c as shown in FIG. 2, of the frame 35. In the preferred embodiment as shown in FIG. 3, the spring 91, which is stiff for a purpose to be described hereinafter, is held by an elongated bolt 93 which is horizontally fixed to the frame 35 through a hole formed through the spring shoe 87 so that it may keep the cap member 79 by means of the spring shoe 87. Thus, the rocking member 77, together with the cap member 79, is kept biased by the stiff spring 91 about the fixed shaft 65 in the direction opposite to the channel-like concavity 35c, as shown in FIG. 4, of the frame 35.

As shown in FIGS. 3 and 4, a pin 95 is vertically movably disposed in a hole which is vertically formed through the partition 35p of the frame 35 just above the pin 59 for the holding member 57 holding the backup guide rollers 53 and 55. The pin 95 is vertically movably disposed through the partition 35p so that it will ride on the holding member 57 for the backup guide rollers 53 and 55 and project upwardly in contact with the shouldered portion 77s of the rocking member 77 formed as has been described hereinbefore. Thus, the pin 95 is kept biased downwardly to the holding member 57 for the backup guide rollers 53 and 55 by the stiff spring 91 by means of the shouldered portion 77s of the rocking member 77 to enable the backup guide rollers 53 and 55 to hold the back edge of the bandsaw blade 11. However, when a high cutting resistance occurs to cause the bandsaw blade 11 to move upwardly and raise up the holding member 57 through the backup guide rollers 53 and 55, the pin 95 will be upwardly moved by the holding member 57 to rock the rocking member 77 around the shaft 65 against the stiff spring 91 to move the sensing means 83. Also, the sensing means 83, when moved, will sense or detect the relative displacement of the magnetic element 75 and will output a direct voltage according to the displacement of the magnetic element 75 as has been described hereinbefore. In this arrangement, the displacement of the sensing means 83 and the magnetic element 75 will be much magnified or enlarged as compared with the upward movement of the bandsaw blade 11 by the function of the lever of the rocking member 77. Thus, it will be understood that the vertical movement of the bandsaw blade 11 and the normal components of the cutting resistance can be detected by an output voltage which will be made by the sensing means 83. Also, the guide assembly 21 is covered by a plate or plates 97 and is provided with a pipe 99 for supplying a cutting coolant to the bandsaw blade 11.

In the above described arrangement, the holding member 57 is kept lowered by the stiff spring 91 by means of the spring shoe 87, the rocking member 77, and the pin 95 when the cutting resistance pushing up against the bandsaw blade 11 in FIG. 3 is normal or not high during a cutting operation. However, as soon as the cutting resistance is increased to raise the bandsaw blade 11, the holding member 57 will be raised up by the bandsaw blade 11 by means of the backup guide rollers 53 and 55 to raise the pin 95 to move the rocking member 77 around the shaft 65 against the spring 91. When the rocking member 77 is moved around the shaft 65 originally by the bandsaw blade 11 through the holding member 57, the sensing means 83 will be moved about the magnetic element 75 to sense or detect the relative displacement of the magnetic element 75 and will output a direct voltage according to the detected displacement. Thus, the cutting resistance pushing up against the bandsaw blade 11 can be detected from the output made by the sensing means 83 to control the feeding speed and force of the bandsaw blade 11 to the optimum. In this connection, it will be understood that the cutting resistance pushing up against the bandsaw blade 11 can be detected also by obtaining the deflection or compression of the spring 91 by measuring device of a suitable means such as a strain gage.

As has been so far described in the above, the cutting resistance pushing up against the bandsaw blade 11 is detected by the sensing means 83, according to the present invention, directly from the upward movement of the bandsaw blade 11 during a cutting operation. Also, in order to detect the cutting resistance against the bandsaw blade 11, the slight movement of the bandsaw blade 11 is magnified or enlarged by the function of the lever of the rocking member 77. Accordingly, the cutting resistance against the bandsaw blade 11, including changes in the cutting resistance, can be immediately and accurately detected during a cutting operation according to the present invention.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A method for controlling a bandsaw blade in response to the cutting resistance of a workpiece to the bandsaw blade, comprising the steps of:
    (a) providing a pivot lever having a sensing element mounted therein in alignment with the pivot point of the lever;

(b) amplifying movement of the bandsaw blade in a direction opposite to a direction of feed of the bandsaw blade and normal to a running direction of the bandsaw blade by rocking the pivot lever and sensing element with a movement representative of the actual blade movement;

(c) detecting the amplified movement of the bandsaw blade in the direction opposite to the directon of feed of the bandsaw blade and normal to the running direction of the bandsaw blade by the sensing element; and (d) adjusting the feeding force of the bandsaw blade during a cutting operation in immediate response to the magnitude of the movement of the bandsaw blade.

2. The method according to claim 1, further comprising the step of transferring motion of the bandsaw blade in a direction opposite to a direction of feed of the bandsaw blade by means of a pin arranged between the bandsaw blade and pivot lever.

3. The method according to claim 1, wherein the step of detecting the amplified movement of the bandsaw blade includes locating a detectable element on a stationary element adjacent the sensing element and sensing relative motion between the sensing element and the detectable element when the pivot lever is rocked.

4. An apparatus for detecting the cutting resistance of a workpiece to a bandsaw blade, comprising:
(a) a guide assembly for guiding the bandsaw blade with its cutting edge facing vertically downwardly;
(b) movable backup guide means, arranged in the guide assembly, for holding down the bandsaw blade along its back edge;
(c) magnifying means having a rockable pivot lever arranged above the guide assembly for magnifying movement of the backup guide means;
(d) a displaceable sensing element provided on the pivot lever in alignment with the pivot of the pivot lever;
(e) means for detecting the magnitude of displacement of the sensing element.

5. The apparatus according to claim 4, wherein:
said movable backup guide means are rollers; and
said detectable element is made of a magnetic substance.

6. An apparatus for controlling the feeding force of a bandsaw blade in response to cutting resistance of a workpiece to the bandsaw blade, comprising:
a bandsaw blade having a cutting edge and a back edge;
means for feeding the bandsaw blade into the workpiece in a feeding direction;
means arranged along the back edge of the bandsaw blade for detecting movement of the bandsaw blade in a direction opposite to the feeding direction;
a pivot lever having a sensor and pivot point arranged intermediate the lever cooperating with said detecting means for moving the sensor with an amplified movement representative of the detected movement of the bandsaw blade;
means for converting the amplified movement of the sensor into a signal proportional to the detected movement;
means for controlling the feeding force of the bandsaw blade in response to the detected movement.

7. The apparatus according to claim 6, wherein the detecting means comprises rollers.

8. An apparatus for controlling the feeding force of a bandsaw blade in response to cutting resistance of a workpiece to the bandsaw blade, comprising:
a bandsaw blade having a cutting edge and a back edge;
means for feeding the bandsaw blade into the workpiece in a feeding direction;
means arranged along the back edge of the bandsaw blade for detecting movement of the bandsaw blade in a direction opposite to the feeding direction;
means cooperating with said detecting means for amplifying the detecting movement of the bandsaw blade;
means for converting the amplified movement into a signal proportional to the detected movement;
means for controlling the feeding force of the bandsaw blade in response to the detected movement;
wherein the detecting means comprises rollers;
wherein the amplifying means comprises:
a shaft;
a rocking member pivotally arranged on said shaft;
a pin interposed between said rollers and said rocking member such that when the bandsaw blade raises the roller, the pin rocks the rocking member on the shaft.

9. The apparatus according to claim 8, further comprising a spring means for biasing the rocking member.

10. The apparatus according to claim 8, further comprising a stationary holding member having a magnetic element thereon arranged on the rocking member for sensing relative motion between the magnetic element and the rocking member.

11. A method for controlling a bandsaw blade having a cutting edge and a back edge in response to the cutting resistance of a workpiece to the bandsaw blade, comprising the steps of:
feeding the bandsaw blade into the workpiece in a feeding direction;
providing a means along the back edge of the bandsaw blade for detecting movement of the bandsaw blade in a direction opposite to the feeding direction;
amplifying the detected movement of the bandsaw blade;
converting the amplified movement into a signal proportional to the detected movement;
controlling the feeding force of the bandsaw blade in response to the detected movement;
wherein amplifying the detected movement of the bandsaw blade comprises the steps of:
raising a pin by the detecting means in response to movement of the bandsaw blade in a direction opposite to the feeding direction; and
rocking a rocking member with the pin in response to the bandsaw blade movement.

12. The movement according to claim 11, wherein converting the amplified movement comprises the steps of:
arranging a magnetic element on a stationary element adjacent to the rocking member; and
sensing the relative movement of the rocking member with respect to the stationary element by means of a sensing means mounted on the rocking member.

* * * * *

UNITED STATES PATENT AND TRADEMARK OFFICE
CERTIFICATE OF CORRECTION

PATENT NO. : 4,557,168
DATED : December 10, 1985
INVENTOR(S) : TORU TOKIWA

It is certified that error appears in the above—identified patent and that said Letters Patent is hereby corrected as shown below:

IN THE CLAIMS:

Claim 10, line 33, after "thereon" insert --, the sensor being--.

Signed and Sealed this

Twenty-second Day of April 1986

[SEAL]

Attest:

DONALD J. QUIGG

Attesting Officer    Commissioner of Patents and Trademarks